(12) United States Patent
Van Vooren et al.

(10) Patent No.: US 7,137,237 B2
(45) Date of Patent: Nov. 21, 2006

(54) FORAGE HARVESTER BLOWER

(75) Inventors: Sandor Willy Van Vooren, Sijsele-Damme (BE); Bernard Erik Depestel, Oedelem (BE); Pierre Teetaert, Aartijke (BE)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 11/069,663

(22) Filed: Mar. 1, 2005

(65) Prior Publication Data

US 2005/0196305 A1 Sep. 8, 2005

(30) Foreign Application Priority Data

Mar. 5, 2004 (GB) ................... 0405003.5

(51) Int. Cl.
*A01D 87/00* (2006.01)
(52) U.S. Cl. ............. 56/12.8; 406/96; 406/99; 460/114
(58) Field of Classification Search ............ 56/12.8, 56/13.3, 16.6; 406/96–104; 460/114, 115
See application file for complete search history.

(56) References Cited

U.S. PATENT DOCUMENTS

| 787,917 | A | * | 4/1905 | Harpstrite | 406/101 |
| 2,754,650 | A | * | 7/1956 | Fergason | 56/30 |
| 4,412,761 | A | * | 11/1983 | Sorensen et al. | 406/98 |
| 4,425,058 | A | * | 1/1984 | Sorensen et al. | 406/100 |
| 4,821,495 | A | * | 4/1989 | De Buhr et al. | 56/13.3 |
| 4,930,944 | A | * | 6/1990 | VanGinhoven | 406/97 |
| 5,964,080 | A | | 10/1999 | Leeb | |

FOREIGN PATENT DOCUMENTS

| EP | 0283638 A1 | 9/1988 |
| EP | 1229778 B1 | 7/2003 |

* cited by examiner

*Primary Examiner*—Thomas B. Will
*Assistant Examiner*—Alicia Torres
(74) *Attorney, Agent, or Firm*—Rebecca Henkel

(57) ABSTRACT

The present invention relates to a forage harvester blower including a blower rotor having a plurality of generally radially extending rotor paddles which operate in a corresponding substantially cylindrical housing, characterised in that said housing is provided with adjustment mechanism for at least locally adjusting the diameter of the housing. The present invention further relates to a method for optimising the operation of a forage harvester blower and to a method for preventing damage to a forage harvester blower during operation.

6 Claims, 4 Drawing Sheets cross-section A-A

FORAGE HARVESTER BLOWER

FIELD ON INVENTION

The present invention relates to forage harvesters and more particularly relates to a forage harvester blower for receiving and delivering chopped forage. The present method also relates to an improved method for operating said forage harvester blower.

BACKGROUND OF INVENTION

Generally, forage harvesters chop crop material, such as grass or maize, into small particles for storage and subsequent feeding to livestock. Conventional harvesters comprise a rotating cutter head with a plurality of knives, which co-operates with a stationary shear bar to cut the crop material fed thereto into small particles and deliver it to discharge mechanism. It is well-known in forage harvesters to provide a blower for receiving chopped forage either directly from the cutter head or from kernel processing rolls or an impeller or other forage moving apparatus located between the cutter head and blower and for delivering the chopped forage to a forage collecting container such as the box of a wagon or truck, for example.

In an attempt to minimise plugging, designers have advantageously located the blower so as to receive the chopped forage in a relatively thin mat flowing along the outer periphery of the cylindrical blower housing where the forage is engaged and accelerated upwardly by blades or paddles extending generally radially from the blower rotor.

An important problem associated with conventional harvester blowers is that the blowers may be seriously damaged when a foreign object enters the blower. Sometimes, during field activities foreign objects can enter the blower area and cause serious damage to the blower rotor and blower housing. This phenomenon is called a 'blow-up'. Most of the time it starts when a stone or other hard object enters the harvester, in particular the cutter head, and gets stuck between a knife of the rotating cutter drum and it's counter knife or shear bar. This causes the knife to break such that this piece gets stuck between a subsequent knife and counter knife. A chain reaction is the result. Parts that leave the cutter head area are thrown into the blower and can plug the blower by getting stuck between the rotor and the housing of the blower unit. In most cases, this results in a deformation of the shaft on which the blower rotor is mounted and/or in a deformation of the housing and a serious decrease in efficiency of the blower. Presence of foreign objects in the blower may induce considerable material damage and material loss such that deformed rotor and/or housing will have to be removed and replaced, which involves expensive repair costs and which is time-consuming. Furthermore, the blow-up phenomenon also involves serious risks from a security point of view, since the blower can break down during operation.

The present invention aims to provide a solution to the above-mentioned problem. It is therefore, an objective of the present invention to provide a blower showing improved security and wherein repair costs as a consequence of a blow-up phenomenon can be reduced. The present invention provides a solution to the above-mentioned problems by providing a blower unit having an adjustable housing.

SUMMARY OF INVENTION

In a first aspect, the present invention provides an improved forage harvester blower. The blower is suitable for receiving chopped crop materials either directly from a cutter head or from a processing unit in a forage harvester and for conducting said chopped material to a subsequent discharging unit. The terms "crop material" or "crop" are used herein as synonyms and refer to crops containing kernels, such as maize, as well as to kernel-free crops such as alfalfa or grass.

More specifically, the present invention provides in a first embodiment a forage harvester blower including a blower rotor having a plurality of generally radially extending rotor paddles which operate in a corresponding substantially cylindrical housing, characterised in that said housing is provided with adjustment mechanism for at least locally adjusting the diameter (D) of the housing.

The term "diameter D" as used herein refers to the working diameter of the housing: i.e. the diameter of the housing where the edges of the rotor paddles most closely approach the housing.

The present invention provides a solution to the above-mentioned problem of increased security hazards and considerable material loss of a harvester blower when a foreign object enters the blower by providing a blower capable of quickly and easily evacuating and removing a foreign object that has entered the blower. For that, the blower is provided with adjustment mechanism for at least locally adjusting the diameter (D) of the housing. By locally enlarging the diameter of the housing, e.g. when a foreign object gets stuck in the blower for instance between the rotor paddles and the housing, the present invention permits to reduce the risks of blow-up and expensive repair costs associated therewith.

In addition, this solution has the additional effect of considerably improving blower efficiency. In conventional forage harvesters efficiency of the blowing unit decreases as the rotor blades or paddles wear out. When the rotor paddles wear out, the distance between the outer edges of the rotor paddles and the housing increases, which seriously reduces efficiency of the blower. It is required to frequently replace the worn out rotor paddles in order to maintain blower efficiency. However, this requires the blower unit to be dismantled and the rotor to be removed from the blower, which involves a substantial amount of work and which brings along serious additional costs. The present invention provides a solution therefore by providing a blower unit having a housing of which the diameter can be locally adjusted. According to the invention, the diameter of the housing can be adjusted such that the distance between the outer edges of the rotor paddles and the housing can be minimised. By doing so, the present invention thus provides a blower unit wherein blower efficiency is considerably improved.

In a preferred embodiment, the present invention provides a forage harvester blower wherein the adjustment mechanism comprises a wear plate having a position which is adjustable such that by adjusting the position of the wear plate the diameter (D) of the blower housing can be adjusted. In a preferred embodiment, the wear plate is provided between the inlet section and the outlet section of the blower.

The invention allows easy and accurate adjustment of the diameter of the housing by adjusting the position of a wear plate provided on the housing, either inwardly to the centre of the rotor or outwardly away from the centre of the rotor. For that purpose, in a preferred embodiment, the wear plate is pivotably hinged on the blower housing and movable such that the diameter (D) of the housing can be adjusted by pivoting the wear plate. In another embodiment, the wear plate is connected to the housing by mechanism of two adjustment assemblies, which are suitable for adjusting the position of said wear plate, whereby one assembly is provided on each side of said wear plate. More specifically, the wear plate is positioned in the blower in a way so it can pivot around its upper fixation (hinge) points, while the position of the wear plate can be adjusted by mechanism of the adjustment assemblies. The position of the wear plate can be adjusted in order to minimise the play between the outer edges of the rotor paddles and the inside of the blower housing. The invention ensures an optimal set up of the blower paddle distance to the wear plate and thereby ensures optimal blower efficiency. Furthermore, the distance of the housing to the outer edges of the rotor paddles can be easily adjusted in function of the wear and tear degree of the paddles. Replacement of worn out rotor paddles can be delayed and the rotor paddles can be used for a longer time.

In a further embodiment of the present invention each adjustment assembly comprises an active adjustment unit for manually adjusting the position of the wear plate and a passive adjustment unit for automatically adjusting the position of the wear plate. The active unit can be manually operated in order to manually position the wear plate on a certain desired distance from the rotor paddles. The passive adjustment unit can be automatically activated when the pressure F exerted on the wear plate exceeds a threshold value. The passive adjustment units can be automatically activated without intervention of an operator. More specifically, the passive adjustment unit comprises a security mechanism, which enables the wear plate to automatically retract outwardly when the pressure F exerted on the wear plate exceeds a certain threshold value. This may occur when a foreign object gets stuck in the blower, e.g. between the rotor paddles and the housing. The present invention thus permits to reduce the risks of blow-up and expensive repair costs associated there with. Automatic retraction of the wear plate facilitates the removal of foreign objects out of the blower unit and thus increases protection of the blower rotor from damage due to the action of these objects. The present invention thus provides a blower having improved security and facilitated handling. In a preferred embodiment, the active adjustment unit is provided on the housing and the passive adjustment unit is provided on the wear plate. In another preferred embodiment, the active adjustment unit is connected to the passive adjustment unit.

The present invention further provides the following advantages. The wear plate can be easily removed, creating easy access to the blower for an operator which needs to do maintenance work, e.g. replacing the blower paddles. Furthermore, the present invention enables to easily remove and replace the wear plate at minimal costs when it is worn.

In a second aspect, the present invention provides a method for optimising the operation of a forage harvester blower, said blower comprising a plurality of generally radially extending rotor paddles operating in a corresponding substantially cylindrical housing, comprising the step of adjusting at least locally the diameter (D) of the housing when the blower efficiency differs from a threshold value. The term "foreign object" as used herein refers to undesired, not crop-related objects, such as e.g. stones. In a preferred embodiment, the diameter (D) of the housing is adjusted by adjusting the position of an adjustment mechanism provided on the blower housing. Preferably, said adjustment mechanism comprises a wear plate, which is hinged on the blower housing and provided with adjustment assemblies to adjust its position on the housing. The method comprises the step of reducing the diameter (D) of the blower housing by adjusting the position of the adjustment mechanism on the blower housing such that the distance between the outer edges of the rotor paddles and the blower housing is minimal. The method may also comprises the step of increasing the diameter (D) of the blower housing by adjusting the position of the adjustment mechanism provided on the blower housing such that a foreign object can be removed from the blower.

A forage harvester blower in accordance with the present invention will now be described in greater detail, by way of example, with reference to the following drawings.

DETAILED DESCRIPTION OF THE FIGURES

DETAILED DESCRIPTION OF THE PREFERRED EMBODIMENT

The present invention will now be described with reference to certain embodiments and certain drawings but the invention is not limited thereto. The drawings are schematic. The terms "front", "rear", "forward", "rearward", "right" and "left" used throughout the specification are determined with respect to the normal direction of movement of the machine in operation and are not to be construed as limiting terms.

Figure 1:
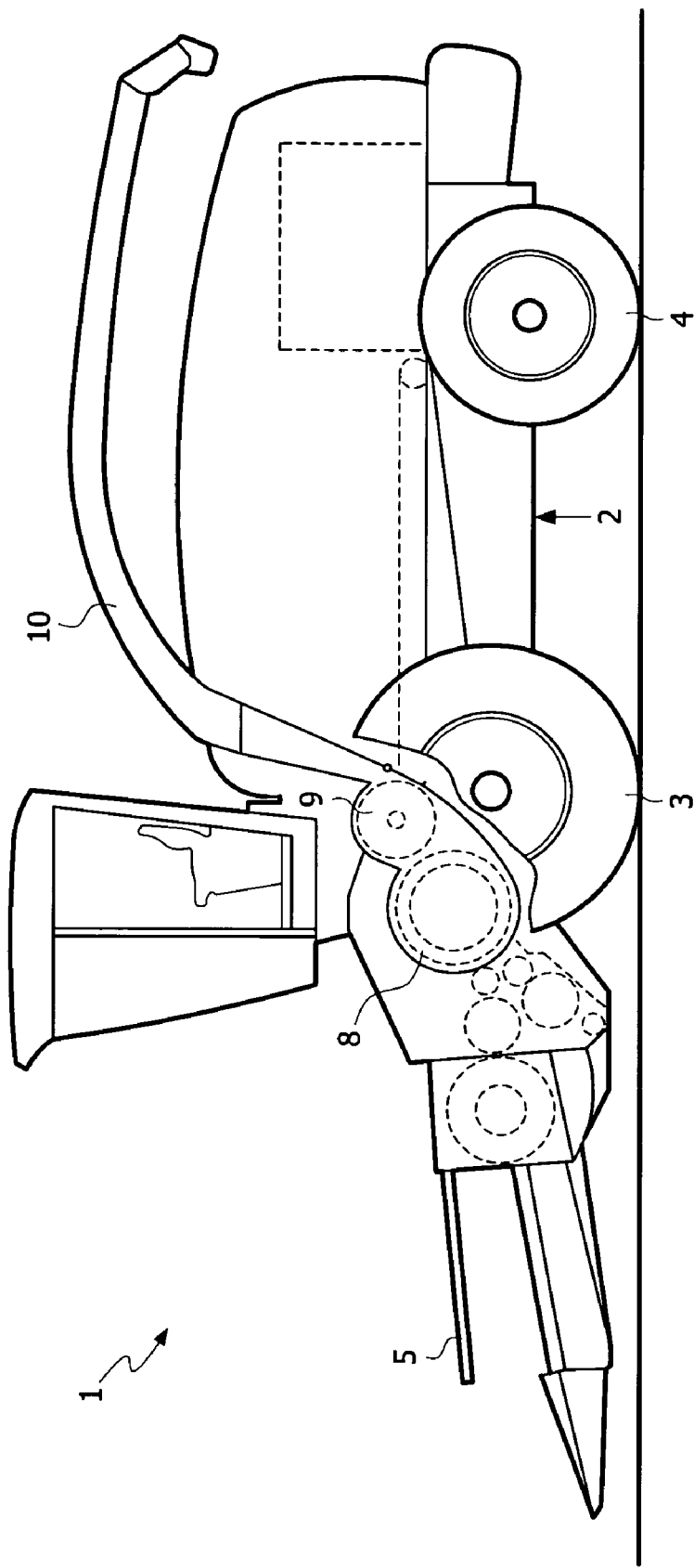
FIG. 1 is a side view of a self-propelled forage harvester embodying a blower constructed in accordance with the present invention.

Referring to FIG. 1, there is shown a self-propelled forage harvester 1 which embodies the present invention. It being noted that the principles of the present invention could be applied to towed forage harvesters as well. The forage harvester 1 includes a main frame 2 supported on front and rear pairs of wheels 3 and 4, of which only one of each pair is shown. The forage harvester is shown equipped with a crop collecting apparatus, in the form of a row crop attachment 5, suitable for the harvesting of maize, but which can be replaced with a conventional windrow pick-up device or a conventional cutter bar attachment, depending on the type of crop to be harvested. Customarily, the crop collecting apparatus is provided for severing a crop, such as corn or the like, from the ground and directing it to be chopped into forage by knives of a transverse cylinder type cutter head 8. Chopped forage is delivered rearwardly by the cutter head 8 to a blower 9 which, in turn, delivers the chopped forage upwardly into, and creates an air stream for expelling it through, a rearwardly extending discharge conduit or spout 10.

The forage harvester may further be provided with a crop processing unit (not shown). When a crop processing unit is provided, the chopped material is thrown by the cutter head into the crop processor, which processes (cracks), the kernels and transfers the material into a blower, which in its turn ejects the crop into a trailer or container. Preferably, the crop processing unit can be moved into the stream of chopped material or removed there from according to arrangements as shown for example in EP-B-1 229 778.

Figure 2:
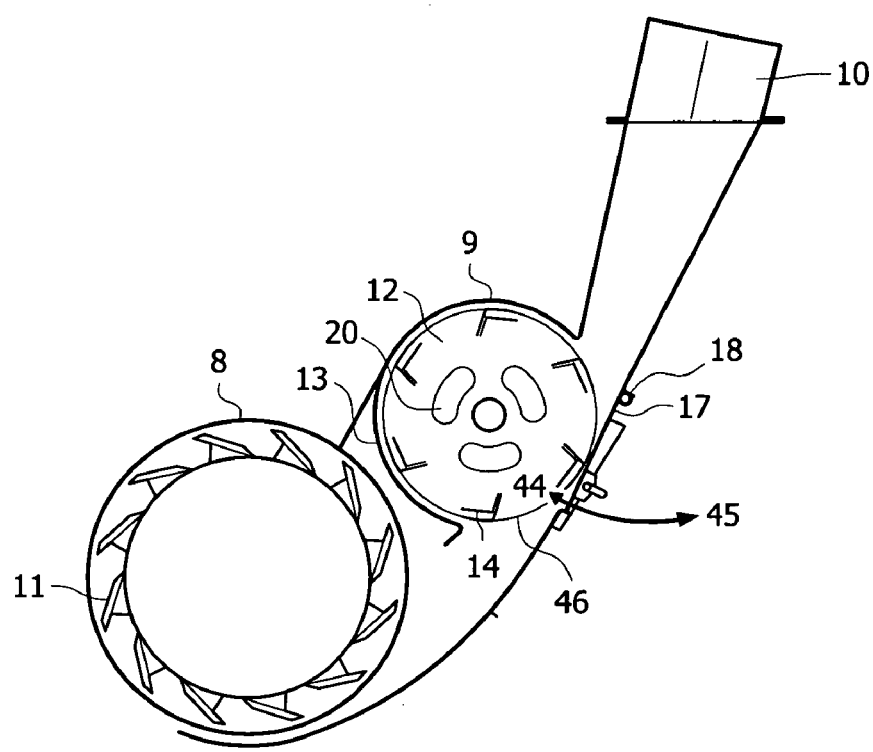
FIGS. 2 and 3 are detailed vertical sectional views of a blower constructed in accordance with the present invention.

A detailed arrangement of the cutter head 8 and the blower 9 in accordance with an embodiment of the present invention is shown in FIG. 2. The blower 9 is provided in between the cutter head 8 and the discharge spout 10. The position of the blower 9 relative to the cutter head 8 and discharge spout 10 is thought to result in a structure for efficiently conveying crop from the cutter head 8 to a discharge spout 10 and further to a forage collection container. The illustrated cutter head 8 is a transverse cylinder type cutter head 8 provided with a plurality of radially extending knives 11. Crop material is chopped into forage by the knives 11 of the cutter head 8 and delivered rearwardly by the cutter head 8 to the blower 9. The spout 10 can be positioned by an operator to direct the cut crop material as required, normally into a wagon, which is moving alongside or behind the forage harvester.

Figure 3:
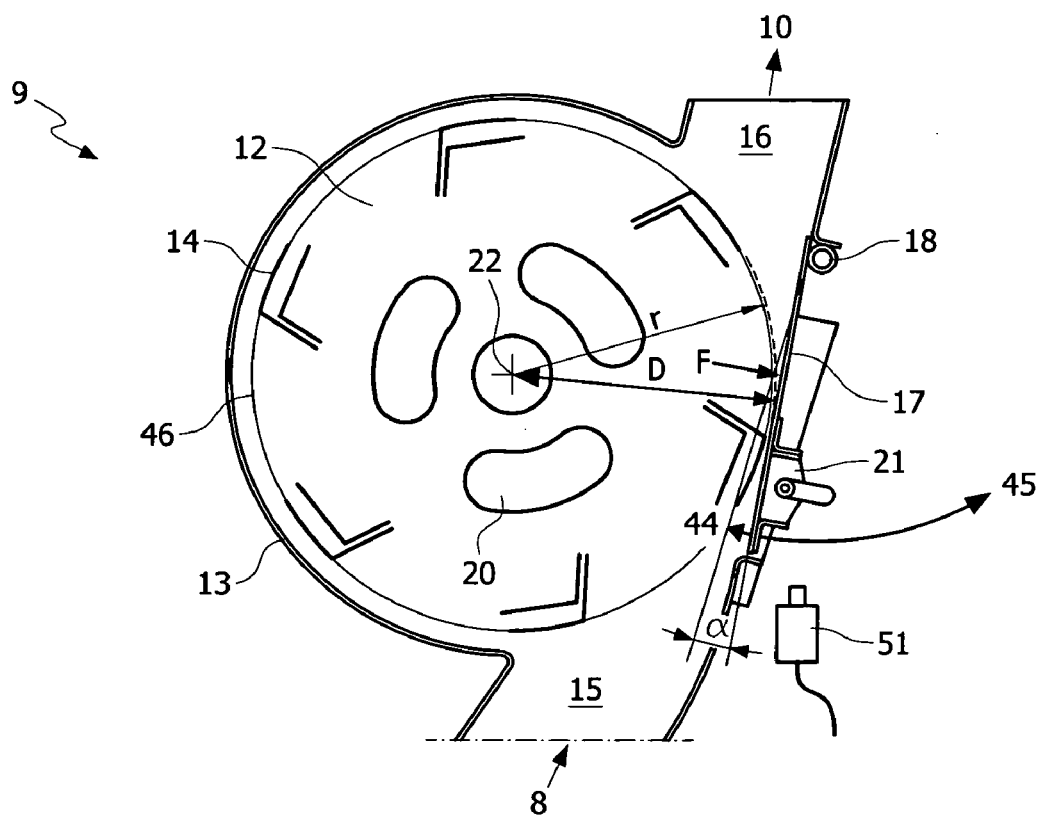

Referring to FIG. 3, there is shown a detailed arrangement of a blower 9 which is representative of the present invention. The blower 9 includes a housing 13 having an inlet section 15 extending rearwardly and upwardly from a lower right quadrant of the cutter head 8, to a lower right quadrant of a cylindrical section of the housing 13, and an outlet section 16 extending upwardly between an upper right quadrant of the cylindrical section of the housing 13 and an entrance to the discharge spout 10 (not shown). Located within the substantially cylindrical section of the housing 13 is a rotary blower rotor 12 including a transverse axle 22 extending through and being journalled (not shown) in opposite end walls of the housing 13. The rotor 12 and the housing 13 extend generally co-axially. The rotor is provided with air stream openings 20. The blower rotor 12 comprises a plurality of generally radially extending blades or paddles 14, which are preferably equidistantly connected to the rotor axle and which have outer edges that trace a cylindrical path 46 spaced closely to the housing 13. The distance of the outer edges of the rotor to the rotor axle is indicated with r. It will be clear that this distance r may vary and be reduced as the outer edges of the rotor paddles 14 wear out.

Forage leaving the cutter head 8 is fed directly into the periphery of the blower housing 13, at its lower right quadrant, approximately tangential to the outer diameter of the blower rotor 12 and in the same direction of movement as that of the rotor paddles or blades 14. Each paddle 14 collects the crop at its outer end as it moves the crop along the blower housing 13 periphery to and then discharges it uniformly up through the outlet section 16 into and through the spout 10. The impact of the rotor blades 14 against the incoming crop is minimised because they have approximately the same direction of movement and thus the energy required to impel the crop is reduced.

At the backside of the blower 9 a wear plate 17 is pivotally attached to the housing 13. As illustrated the top of this plate 17 is hinged to the topside of the blower housing 13, e.g. by mechanism of two removable pins 18, of which one is represented in FIG. 3. It should be clear that a second pin is provided symmetrically at the other side of the wear plate 17 (see FIG. 4). The wear plate 17 can pivot around these hinge points under an angle a inwardly 44 towards the rotor axle thereby reducing the diameter D of the housing 13. The maximal inward movement 44 of the wear plate 17 is determined and restricted by the outer edges of the rotor paddles. The wear plate 17 may also pivot around the hinge points outwardly 45, thereby enhancing the diameter D of the housing 13. It will be clear from FIG. 3 that outward movement of the wear plate is not limited and that the plate may be retracted outwardly under any angle, if required. The diameter D is the diameter of the housing where the outer edges of the rotor paddles lay most closely to the blower housing. Specifically, because the rotor paddles 14 wear out, the position of the wear plate 17 can be adjusted in order to minimise the distance between the outer edges of the blower rotor paddles 14 and the blower housing 13 such that the blower 9 operates under optimal efficiency. Optimal adjustment of the working diameter D of the housing 13 is especially done in the section of the blower located between the inlet 15 and the outlet 16. Outwards movement 45 of the wear plate 17 can be induced when a pressure F is exerted on the wear plate 17, which exceeds a certain threshold value, e.g. due to the presence of a foreign object in the blower unit. Outwards movement 45 of the plate 17 enables to remove foreign objects from the blower unit and permits to avoid possible crop blockage in the channel between paddles 14 and housing 13.

The bottom of the wear plate 17 is fastened to the blower housing 13 by mechanism of adjustment assemblies 21, of which one is represented in FIG. 3. It should be clear that a second adjustment assembly is provided symmetrically at the other side of the wear plate 17 (see FIG. 4).

Figure 4:
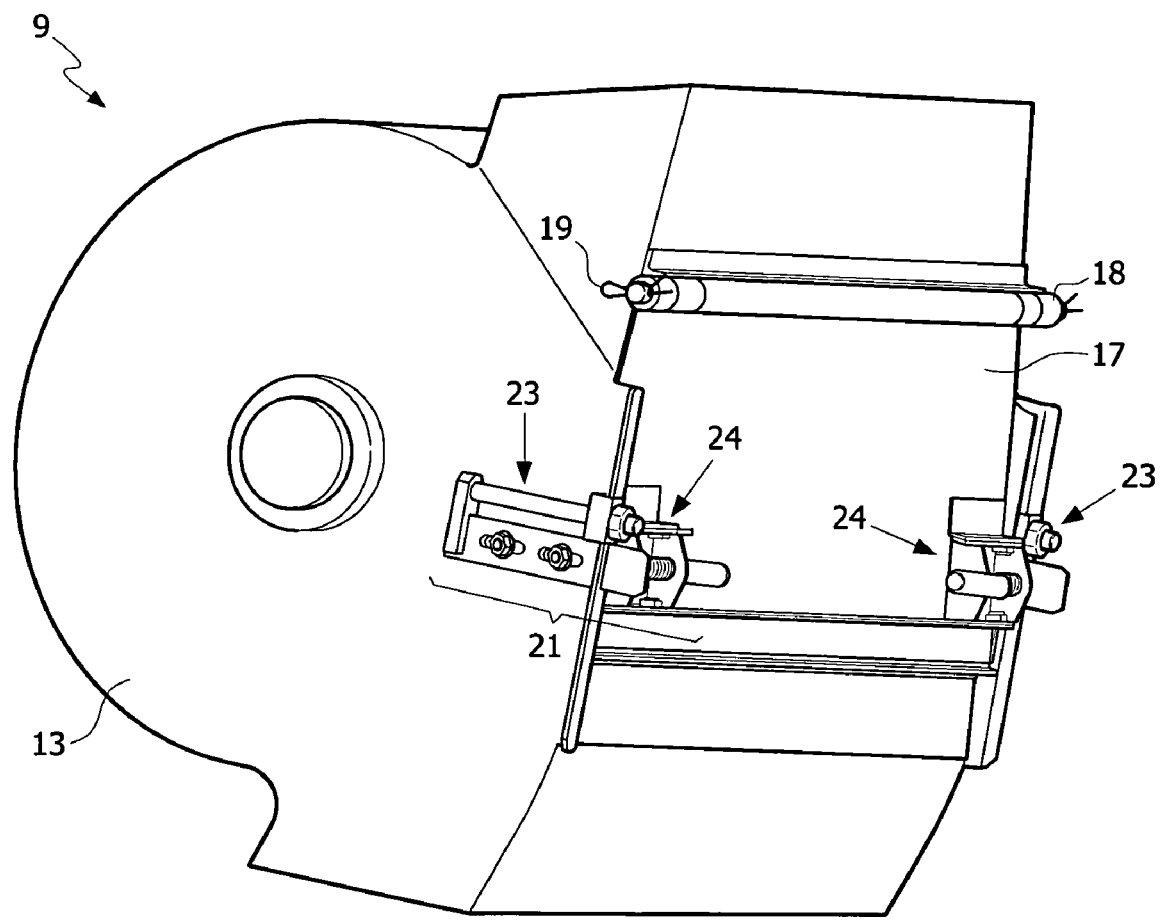
FIG. 4 is a perspective view of a blower constructed in accordance with the present invention and illustrating the fixation of the wear plate to the blower housing.

FIG. 4 illustrates into more detail the fixation of a wear plate 17 to the housing 13 of a blower unit 9, which is representative of the present invention. Preferably, the plate is hinged at its top side, while adjustment assemblies 21 are provided at the bottom side of the wear plate 17 in order to connect the wear plate 17 to the housing 13. However, it should be clear that also other fixation configurations of the wear plate 17 to the housing 13 could be applied. It should also be clear from the FIG. 4 that connection of the wear plate to the housing is performed in a similar way, symmetrically on both sides of the plate.

For connecting the top side of the wear plate 17 to the housing 13, a pair of pins 18 is provided, whereby one pin 18 is provided on each side of said wear plate 17. These removable pins 18 enable to affix the wear plate 17 on the housing 13 such that the top side of the wear plate 17 is hinged on the topside of the housing 13. The pins can be locked in axial way by two spring clips 19, so that no tooling is required when this wear plate 17 needs to be replaced. However, it is clear that other fixation mechanism can be applied to hinge the wear plate to the housing 13.

On its bottom side the wear plate 17 is connected to the housing 13 by mechanism of two adjustment assemblies 21, whereby one assembly 21 is provided on each side of said wear plate 17. Each adjustment assembly 21 is partly fastened on the housing 13 and partly fastened on the wear plate 17. Preferably, each adjustment assembly 21 comprises an active adjustment unit 23 which can be manually operated and which is mounted on the housing 13. Each adjustment assembly 21 also comprises a passive adjustment unit 24, which is preferably mounted on the wear plate 17 and which is able to be activated automatically, in particular when the pressure F exerted on the wear plate 17 exceeds a threshold value. In a particularly preferred embodiment the active adjustment unit 23 is connected to the passive adjustment unit 24. The adjustment assemblies 21 permit to move the bottom side of the wear plate 17 towards the centre of the blower rotor, thereby reducing the distance between the outer edges of the rotor paddles 14 and the wear plate 17. In addition, these adjustment assemblies 21 also permit the wear plate 17 to move outwardly, away from the centre of the blower rotor, thereby increasing the distance between the outer edges of the rotor paddles 14 and the wear plate 17.

This movement is of particular importance in a situation when a foreign object enters the blower. The wear plate 17 swings out in order to provide extra space so that the foreign object can pass the blower unit without causing too much damage.

Figure 5:
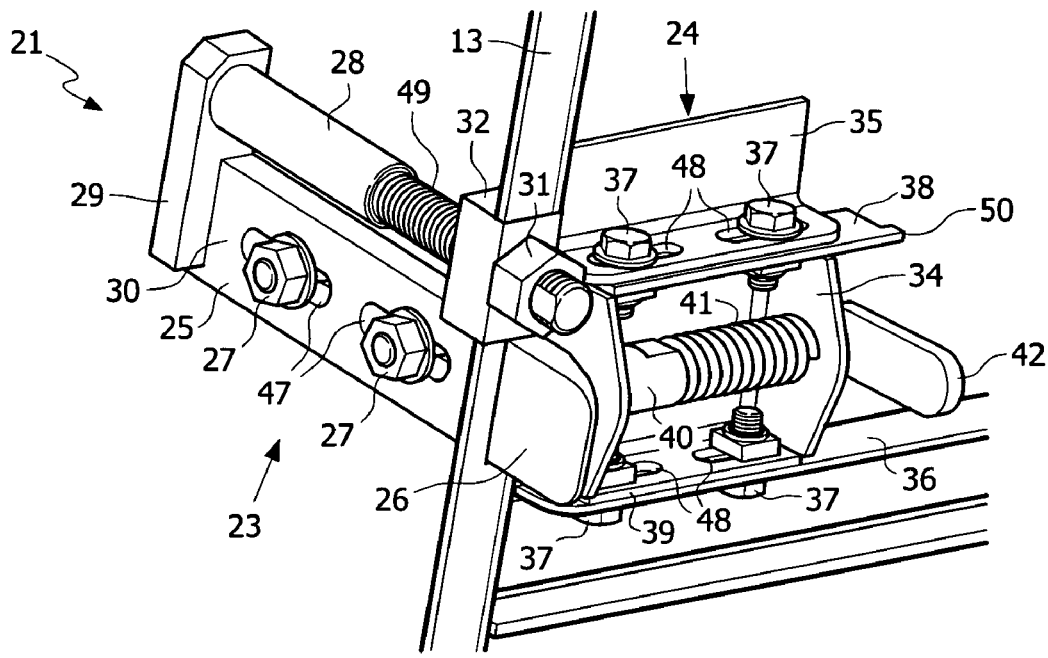
FIGS. 5 and 6 are perspective views of an adjustment assembly constructed in accordance with the present invention.
Figure 6:
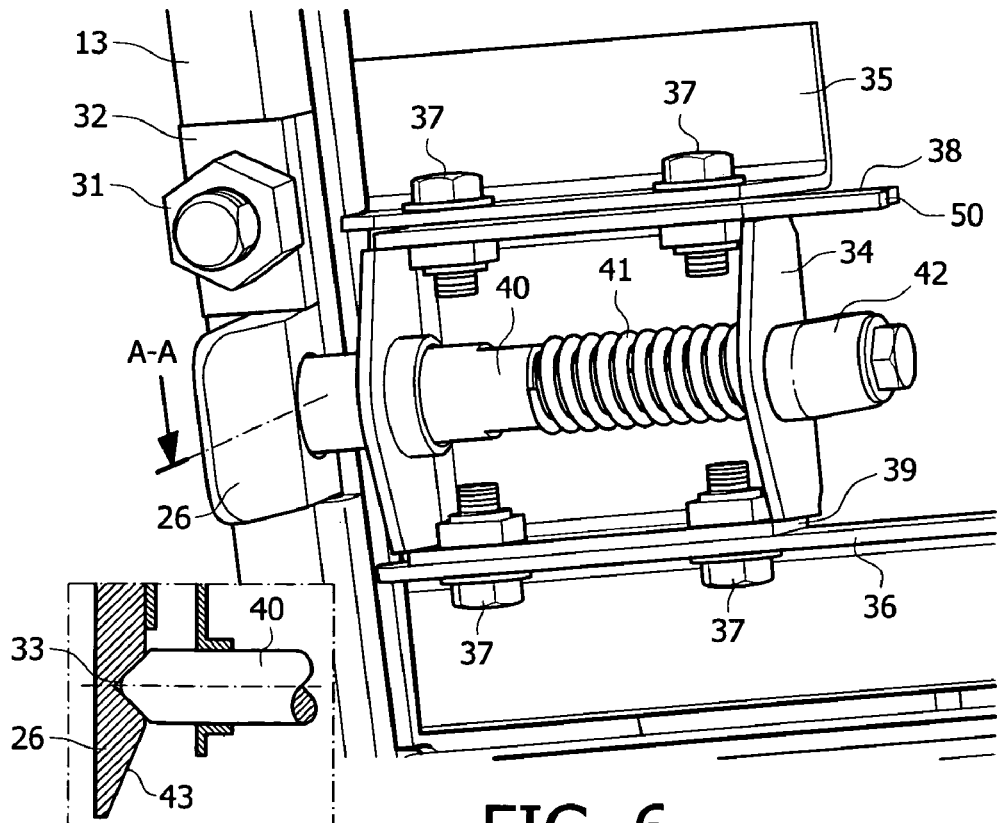

FIGS. 5 and 6 illustrate preferred embodiments of adjustment assemblies 21 which are used in accordance with the present invention to position the wear plate 17 on the blower housing 13. The distance between the rotor paddle and the wear plate can be measured directly through an inspection door (not shown) and manually adjusted if required, for instance in function of the degree of wear and tear of the rotor paddles. Manual adjustment of the position of the wear plate is performed by mechanism of the adjustment assembly 21. The active adjustment units 23 of the assembly 21 comprise a latch 30, which is mounted on the housing 13. The front side 25 of the latch is releasably mounted on the housing 13 and its backside 26 extends outwardly through the housing 13. The front side 25 of the latch 30 is provided with two apertures 47, through which bolts 27 can be provided for affixing the front side 25 of the latch 30 to the housing 13. The bolts 27 can be manually loosened. The latch 30 is further connected to the housing 13 by mechanism of an adjustment rod 28 and plate 29. Rod 28 is provided on one side with a thread 49 which extends outwardly through housing 13. The thread 49 of rod 28 is threadably engaged by a nut 32 which itself is welded to housing 13. The other side of rod 28 extends through an opening (not shown) in plate 29 and is held on the backside by a bolt (not shown) so the rod 28 can rotate freely in the opening of plate 29. Optionally, a nut 31 may be further provided for fixing the rod to the housing 13.

When the two bolts 27 are loosened and nut 31 is released, it is possible to move latch 30 relatively to housing 13 by rotating threaded rod 28. Rotation of rod 28 can be effected by using e.g. a flat spanner which can be placed on the flattened ends of the threaded rod 28.

Rotation of rod 28 in a first direction will move the threaded end 49 of rod 28 through welded nut 32, thereby pulling on plate 29. Plate 29, which is rigidly connected to latch 30, will pull on latch 30 so that the backside 26 of latch 30 will move through an opening in housing 13. Conversely, rotation of rod 28 in the opposite, second direction, will move the threaded end 49 of rod 28 through welded nut 32, thereby pushing on plate 29. Plate 29, rigidly connected to latch 30, will push on its turn to latch 30 so that the backside 26 of latch 30 will move to the opposite side through an opening in housing 13. So the distance between the rotor paddles and the wear plate can then be adjusted by turning the adjustment rod 28 in- or outwards and thereby moving the latch 30 back- or forward.

A passive adjustment unit 24 is mounted in connection to the active adjustment unit 23 on each side of the wear plate 17. The passive adjustment units 24 enable the wear plate to retract outwardly, when a pressure exerted on this plate exceeds a certain threshold limit. Each passive adjustment unit 24, essentially comprising a bracket 24 with a spring-loaded pin 40, is welded on the wear plate 17 by mechanism of an upper 35 and a lower 36 guiding plate. These plates 35, 36 are preferably L-shaped and are welded on the wear plate 17. The guiding plates 35, 36 are provided with two apertures 48, through which bolts 37 can be provided for affixing the guiding plates 35, 36 to a bracket 34. Additionally, an upper 38 and lower 39 protection plate, which are part of the bracket 34, are generally attached intermediately between the guiding plates 35, 36. The plates 38, 39, and bracket 34 are fixed between the guiding plates 35, 36 by mechanism of the bolts 37. The bolts 37 can be manually loosened. When the four bolts 37 are loose, it is possible to move the position of the bracket 34 and the protection plates 38, 39 to adjust the biasing force of the spring 41. As described earlier, the guiding plates 35, 36 are affixed to the wear plate 17. The wear plate 17 can be easily removed and replaced when the plate is worn. For that, the plate 17 with the guiding plates 35, 36, rigidly fixed on the plate, are removed. The bracket 34 can be re-used.

Active and passive adjustment units are inter-connected as follows. The backside 26 of the latch 30, which extends outwardly through the housing 13 is provided with a countersunk hole (shown on FIG. 6). The bracket 34 holds a pin 40 loaded with a spring 41. The pin 40 can be manipulated by mechanism of a handling element 42, which is connected at one extremity of the pin. The other opposite extremity of the pin 40 is forced into the countersunk hole 33 provided at the backside of the latch 30 of the active adjustment unit 23. The handling element 42 can be pulled against the spring tension and will thereby retract the pin 40 out of the countersunk hole 33. The handling element 42 can be stored behind a protrusion 50 extending from the upper protection plate 38. When both pins 40 of the adjustment assemblies 21 are locked behind the protrusions 50 of the protection plates 38, the wear plate 17 can hinge freely as described above.

The passive adjustment units 24 are in connection with the active adjustment units 23 in such a way that operation of the passive units 24 overrules the operation of the active adjustment units. More specifically, one extremity of the spring-loaded pin 40 is forced into the countersunk hole 33 provided at the backside 26 of the latch 30 of the active adjustment unit 23, as illustrated on FIG. 6. When the adjusting rod 28 of the active adjustment assembly 23 is rotated, the position of the countersunk hole 33 changes in relation to the housing, and will cause the wear plate 17 to move relatively to that housing 13. The pin 40 which is forced into hole 33 can move when a sufficient force F is applied to the wear plate 17, resulting in a movement of the wear plate.

The passive adjustment units are automatically activated when the pressure F on the wear plate gets above a threshold limit. A foreign object may enter the blower and get stuck between the rotor paddles and the wear plate. This obstruction will induce a pressure F onto the wear plate 17 (see FIG. 3). The direction of this force is directed towards the backside of the blower. When this pressure F on the wear plate 17 exceeds a certain threshold value, the spring-loaded pin 40 will be forced backwards because of the taps geometry of the countersunk hole 33. The pin 40 will be pressed out of the countersunk hole 33 and the wear plate 17 will move outwards. The wear plate 17 can be re-positioned into its original position by replacing the pin 40 into the position hole 33, and will remain in the position hole 33 because of the force of spring 41. A chamfer 43 on the end of the latch 30 guides the pin into its position hole 33. This can be done manually using the handling element 42 but without the necessity to use any additional tools. Outward movement of the wear plate creates enough space to let a foreign object pass. This mechanism allows easy removal of foreign objects out of the blower housing.

Repositioning of the wear plate 17 in its operational position after a force F was applied to the wear plate 17, can be done manually by pushing the wear plate back into place. The pins 40 of the passive adjustment units 24 are brought back into the countersunk holes 33 providing a secure locking of the wear plate under normal conditions. Manually replacing the wear plate 17 after being forced open has an additional advantage because an operator of the forage harvester 1 will be obliged to check if a foreign object has damaged a part of the blower assembly 9. The wear plate 17 can also be automatically repositioned when e.g. a spring (not shown) is used. The spring can pull the wear plate back to its normal working position after the force F is sufficiently decreased.

In a preferred embodiment, a sensor 51 can be provided which detects movements of the wear plate. If the wear plate 17 is forced out of its normal position due to force F, a signal will be send by the sensor 51 to the cabin of the forage harvester 1, alarming the operator of the problem with the blower assembly 9. The signal from the sensor can also be used to shut down the machine, e.g. for safety reasons. The sensor 51 can be connected to the housing, e.g. at the backside of the blower housing 13 under the wear plate 17. However it should be clear that the sensor 51 may also be positioned elsewhere on the housing, if required.

While the invention has been shown and described with reference to preferred embodiments, it will be understood by those skilled in the art that various changes or modifications in form and detail may be made without departing from the scope and spirit of this invention as defined by the claims.

The invention claimed is:

1. A forage harvester blower including a blower rotor having a plurality of generally radially extending rotor paddles which operate in a corresponding substantially cylindrical housing, wherein the said housing is provided with adjustment mechanism for at least locally adjusting the diameter of the housing, wherein said adjustment mechanism comprises a wear plate having a position which is adjustable such that by adjusting the position of the wear plate the diameter of the blower housing can be adjusted, wherein said wear plate is provided between the inlet section and the outlet section of the blower, wherein said wear plate is pivotably hinged on said housing such that the diameter of the housing can be adjusted by pivoting the wear plate, wherein said wear plate is connected to the housing by a mechanism of at least one adjustment assembly, which is suitable for adjusting the position of said wear plate, wherein each adjustment assembly comprises an active adjustment unit for manually adjusting the position of the wear plate and a passive adjustment unit for automatically adjusting the position of the wear plate, wherein said passive adjustment unit is able to be automatically activated when the pressure F exerted on the wear plate exceeds a threshold value, wherein the active adjustment unit is provided on the housing and the passive adjustment unit is provided on the wear plate, wherein said active adjustment unit is connected to the passive adjustment unit, wherein the active adjustment unit comprises a latch of which the front side is releasably mounted on the housing and of which the back side which extends outwardly from the housing is provided with a countersunk hole, said latch being provided with an adjustable rod that is moveably attached to the housing.

2. Forage harvester blower according to any of claim 1, wherein said passive adjustment unit comprises a bracket which is affixed on the wear plate and which holds a spring-loaded pin.

3. Forage harvester blower according to claim 2, when appended to claim 1, wherein the top of the spring loaded pin of the passive adjustment unit is forced into the countersunk hole provided at the backside of the latch of the active adjustment unit.

4. Forage harvester blower according to any of claim 3, wherein the top of the wear plate is hinged on said housing.

5. Forage harvester blower according to claim 4, wherein the wear plate is hinged on said housing by mechanism of two removable pins, whereby one pin is provided on each side of said wear plate.

6. Forage harvester blower according to claim 5, wherein two adjustment assemblies are provided, whereby one assembly is provided on each side of the wear plate.

* * * * *